United States Patent [19]

Umemoto et al.

[11] Patent Number: 5,866,892
[45] Date of Patent: Feb. 2, 1999

[54] APPARATUS FOR OPTICAL READING OF INFORMATION OPTICAL READER OF INFORMATION HAVING AN INTEGRALLY FORMED HOUSING FOR OPTICAL EQUIPMENT

[75] Inventors: Hiroshi Umemoto; Naoki Tanai, both of Osaka, Japan

[73] Assignee: Keyence Corporation, Osaka, Japan

[21] Appl. No.: 632,129

[22] Filed: Apr. 15, 1996

[30] Foreign Application Priority Data

Apr. 15, 1995 [JP] Japan .................................... 7-125532

[51] Int. Cl.⁶ ...................................................... G06K 7/16
[52] U.S. Cl. ............................................. 235/454; 235/462
[58] Field of Search .................... 235/462, 472, 235/454

[56] References Cited

U.S. PATENT DOCUMENTS 5,233,172  8/1993  Chadima, Jr. et al. ................. 235/472
5,270,525 12/1993  Ukai et al. ............................... 235/472
5,449,892  9/1995  Yamada .................................... 235/462
5,576,529 11/1996  Koenck et al. .......................... 235/472
5,623,137  4/1997  Powers et al. ........................... 235/462

*Primary Examiner*—Anita Pellman Gross
*Assistant Examiner*—Karl Frech
*Attorney, Agent, or Firm*—Sughrue, Mion, Zinn, Macpeak & Seas, PLLC

[57] ABSTRACT

An apparatus for optical reading of information includes: an optical equipment; a photoelectric transducer for transforming a photo signal from the optical equipment into an electrical signal; a signal processing circuit electrically connecting the photoelectric transducer; an apparatus body; a substrate on which the signal processing circuit is mounted, the substrate being mounted in the apparatus body; and a optical equipment housing fixedly accommodating the optical equipment.

28 Claims, 4 Drawing Sheets

APPARATUS FOR OPTICAL READING OF INFORMATION OPTICAL READER OF INFORMATION HAVING AN INTEGRALLY FORMED HOUSING FOR OPTICAL EQUIPMENT

BACKGROUND OF THE INVENTION

1. Field of the Invention

The present invention relates to an apparatus for optically reading bar codes and other information-carrying media. More specifically, the invention relates to an improved layout of optical components such as a light receiving lens, mirrors and photoelectric transducer and a housing therefor.

2. Description of the Related Art

A conventional apparatus for optically reading bar codes and other information-carrying media by light illumination typically designed as shown in FIG. 7, comprises a circuit 1 for processing control and detected signals and a light source 2 such as an LED. The light source is driven by a drive circuit 4 in response to a drive signal from the processing circuit 1, with the issuing light being passed through a projection lens 3 to illuminate a bar code 5.

Furthermore, a light receiving lens 6, a mirror 7 and an image sensor 8 in the form of a charge-coupled device (CCD) which comprises a linear array of photoelectric transducers are provided. The light reflected from the bar code 5 is condensed by the light receiving lens 6 and reflected by the mirror 7 to form a focused image of the bar code on the light receiving surface of CCD 8, which converts the image to an electric signal which in turn is sent to the circuit 1 for further processing.

In the apparatus for optical reading of information thus constituted, it is particularly required that the optics comprising the light receiving lens 6 and the mirror 7 be positioned in exact registry with the light receiving surface of CCD 8. Conventionally, the light receiving lens 6 and the mirror 7 are fixed to a frame or other members that are fixed on the housing of the reading apparatus whereas CCD 8 is secured to a printed-wiring board on which the processing circuit 1 is mounted, thereby achieving registry in the relative positions of the optics and the light receiving surface of CCD 8.

For example, as FIG. 8 shows, mirror 7 is secured to the fixed frame 9 on the housing of the reading apparatus, with the aluminum evaporated reflecting side 11 facing up and with the opposite side bonded to the frame 9 by means of an adhesive or double-side coated adhesive tape 10. Alternatively, as FIG. 9 shows, the mirror 7 is fixed to the frame 9 by means of U-shaped leaf springs 12 which hold them together at opposite ends. On the other hand, as FIG. 10 shows, CCD 8 is fixed to the printed-wiring board 14 by soldering pins 15 onto the processing circuit 1 mounted on the board 14.

A problem with the use of adhesive or double-side coated adhesive tape 10 to fix the mirror 7 as shown in FIG. 8 is the angle of the reflecting surface of the mirror will change with various factors such as fluctuations in the thickness of the adhesive and the effects of temperature or humidity. The use of leaf springs 12 as shown in FIG. 9 also suffers from a disadvantage in that the angle of the reflecting surface of the mirror will change with fluctuations in the thickness of its substrate (i.e., glass). In either case, the mirror 7 fails to have exact registry with the light receiving surface of CCD 8 which is fixed to the printed-wiring board 14 on which the processing circuit 1 is mounted.

Thus, it requires high cost for the components of optics to be positioned in exact registry with a component such as CCD that receives the light image from the optics and, in an extreme case, the exact positioning of these components is practically infeasible.

As a further problem, the limited space cannot be utilized efficiently to realize a compact apparatus for optical reading of information. Additionally, the soldering of CCD 8 (FIG. 10) or the use of an adhesive (FIG. 8) lowers the efficiency of assembling or disassembling operations.

SUMMARY OF THE INVENTION

The present invention has been accomplished under these circumstances and has as an object providing an apparatus for optical reading of information that enables optics comprising a light receiving lens, mirrors, etc. to be easily positioned in registry with the light receiving surface of a photoelectric transducer for receiving the light image from the optics, that allows for efficient assembling and disassembling operations and that assures efficient utilization of the limited space to realize size reduction of the apparatus.

This object of the invention can be attained by either one of the apparatuses set forth in the following paragraphs (1) to (6).

(1) An apparatus for optical reading of information which comprises a housing for accommodating optics and a photoelectric transducer and a substrate on which a signal processing circuit is mounted, said housing being detachably fixed on said substrate with a spacing being provided between said photoelectric transducer and said substrate.

(2) An apparatus for optical reading of information which comprises a housing for accommodating optics and a photoelectric transducer that has projecting terminal pins and a substrate on which is mounted a signal processing circuit having buried sockets for receiving said terminal pins, said terminal pins being inserted into said sockets and said housing being detachably fixed on said substrate with a spacing being provided between said photoelectric transducer and said substrate.

(3) An apparatus for optical reading of information which comprises a housing comprising a front portion for carrying a first mirror which is separable from a body portion for accommodating a light receiving lens, a second mirror and a photoelectric transducer and a substrate on which a signal processing circuit is mounted, said housing being detachably fixed on said substrate with a spacing being provided between said photoelectric transducer and said substrate.

(4) An apparatus for optical reading of information which comprises a housing for accommodating a mirror that is provided between a light receiving lens and a photoelectric transducer and which has the angle of reflection determined by part of the reflecting surface being placed in contact with said housing and a substrate on which a signal processing circuit is mounted, said housing being detachably fixed on said substrate with a spacing being provided between said photoelectric transducer and said substrate.

(5) An apparatus for optical reading of information which comprises a housing for accommodating optics and a photoelectric transducer the bottom of which plate being positioned by contact with a leaf spring and a substrate on which a signal processing circuit is mounted, said housing being detachably fixed on said substrate with a spacing being provided between said photoelectric transducer and said substrate.

(6) An apparatus for reading optical information which comprises a housing for accommodating optics and a photoelectric transducer and a substrate on which a signal processing circuit is mounted, said photoelectric transducer being positioned by contact with said housing, which is detachably fixed on said substrate with a spacing being provided between said photoelectric transducer and said substrate.

The apparatuses set forth paragraphs (1) to (6) share the common feature that a light receiving lens, mirrors and a photoelectric transducer are fixed in a single, integrally molded housing, which is detachably fixed on a substrate that has a processing circuit mounted thereon and which is spaced from the photoelectric transducer. Since the optics and the light receiving surface of the photoelectric transducer for receiving the light image from the optics are both fixed to the single, integrally molded housing, the substrate can be electrically connected to the photoelectric transducer without affecting the precision in the relative positions of the individual optical parts and this improves not only the efficiency of assembling operations but also the reliability of the fabricated reading apparatus.

In addition, the spacing between the photoelectric transducer and the substrate can effectively adsorb the fluctuations in the amount by which the terminal pins on the photoelectric transducer are inserted into the substrate. Since ICs and other components can also be mounted on the side of the substrate in the area that is spaced, from the transducer, the utilization of the substrate is sufficiently increased to realize a compact reading apparatus. What is more, the detachability of the housing from the substrate ensures that the parts in the housing can easily be inspected or disassembled for repair as separate entities from the substrate, thereby improving the efficiency of these operations.

DETAILED DESCRIPTION OF THE PREFERRED EMBODIMENTS

Figure 1:
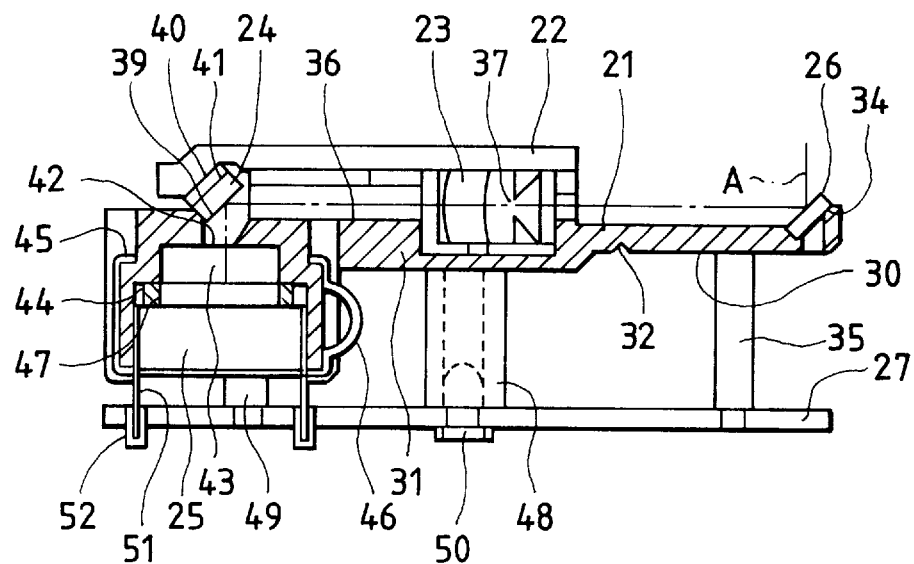
FIG. 1 is a section of an apparatus for optical reading of information according to an embodiment of the invention.
Figure 2:
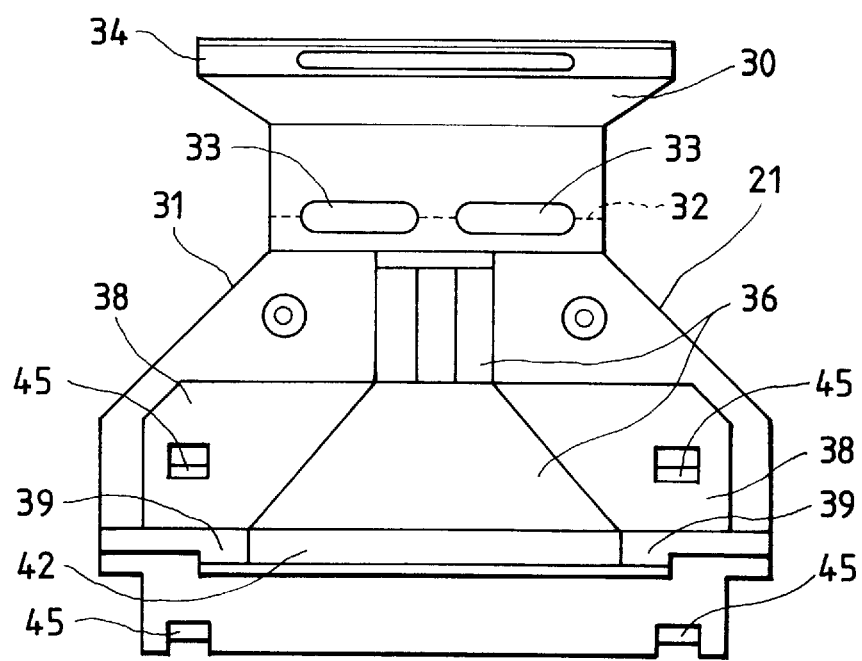
FIG. 2 is a front view of the housing of the apparatus shown in FIG. 1.
Figure 3:
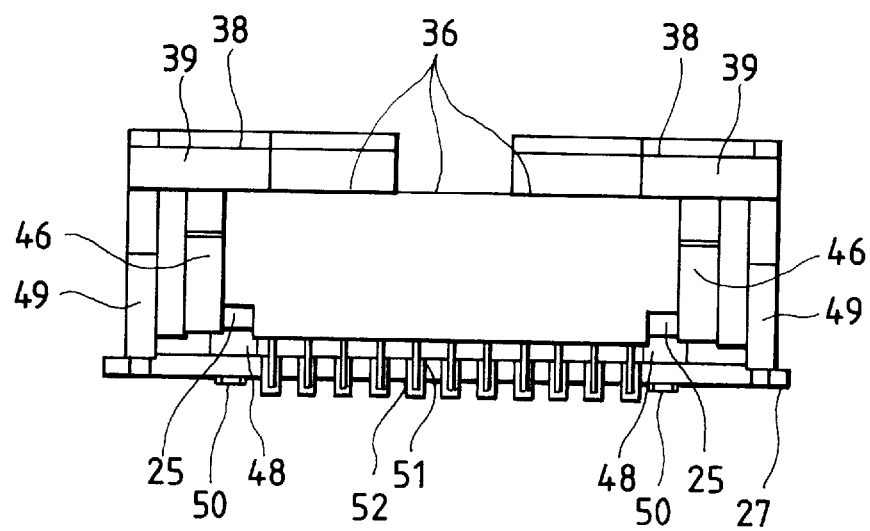
FIG. 3 is a side view of the apparatus shown in FIG. 1.

Embodiments of the invention will now be described with specific reference to FIGS. 1 to 6. FIG. 1 is a section of an apparatus for optical reading of information according to an embodiment of the invention; FIG. 2 is a front view of the housing accommodating the components of the optics shown in FIG. 1; and FIG. 3 is a side view of the apparatus shown in FIG. 1. In FIGS. 1 to 3, like parts are identified by like numerals, with the outer casing of the reading apparatus and the light illuminator being both omitted.

Referring to FIGS. 1 to 3, a housing 21, the lid 22 of the housing (which is shown in only FIG. 1) and a substrate 27 are provided. The housing 21 accommodates a light receiving lens 23, mirrors 24 and 26, and a CCD 25 comprising a linear array of photoelectric transducers; the components 23 to 25 compose optics that receives reflected light from a bar code (as indicated by one-long-and-one-short dashed line A in FIG. 1) and which converts the received light to an electric signal. In this embodiment, the housing 21 serving as an optical unit housing is separately provided from a body (not shown) which the substrate 27 is fixed.

Figure 5:
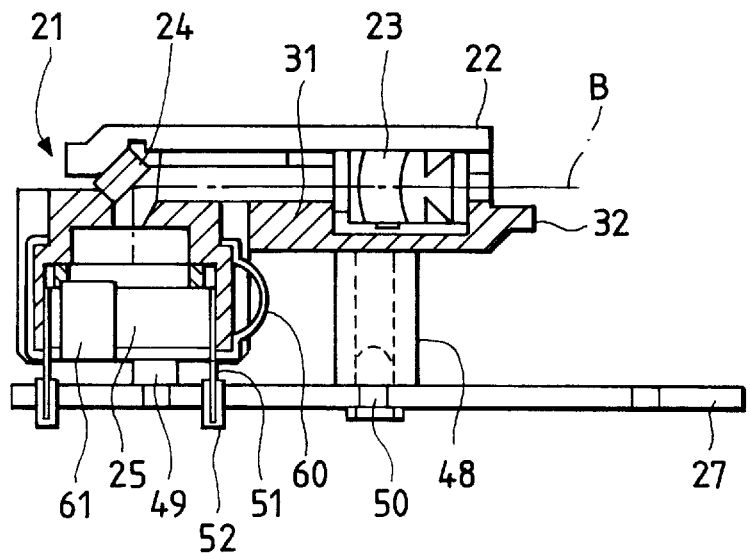
FIG. 5 is a section of an apparatus for optical reading of information according to another embodiment of the invention.
Figure 6:
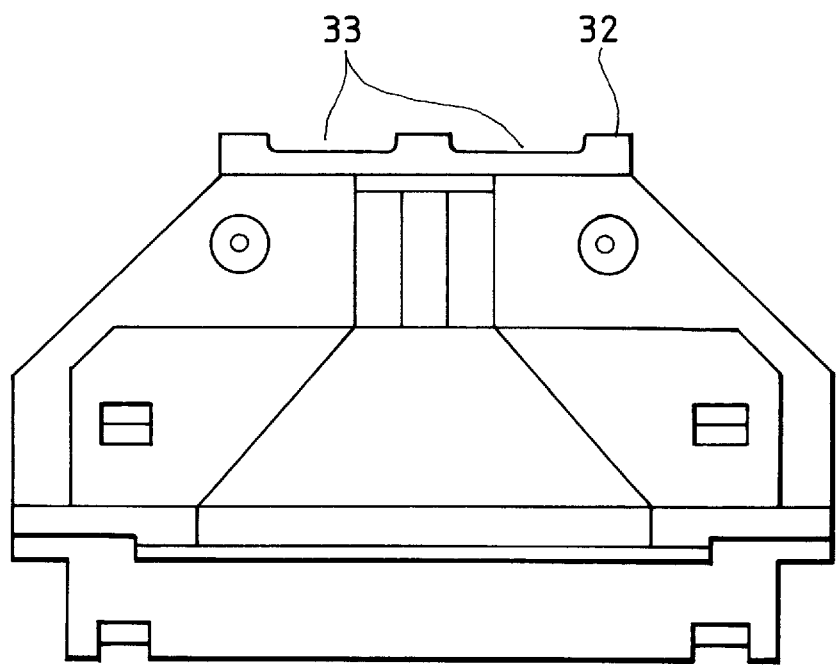
FIG. 6 is a front view of the housing of the apparatus shown in FIG. 5.
Figure 7:
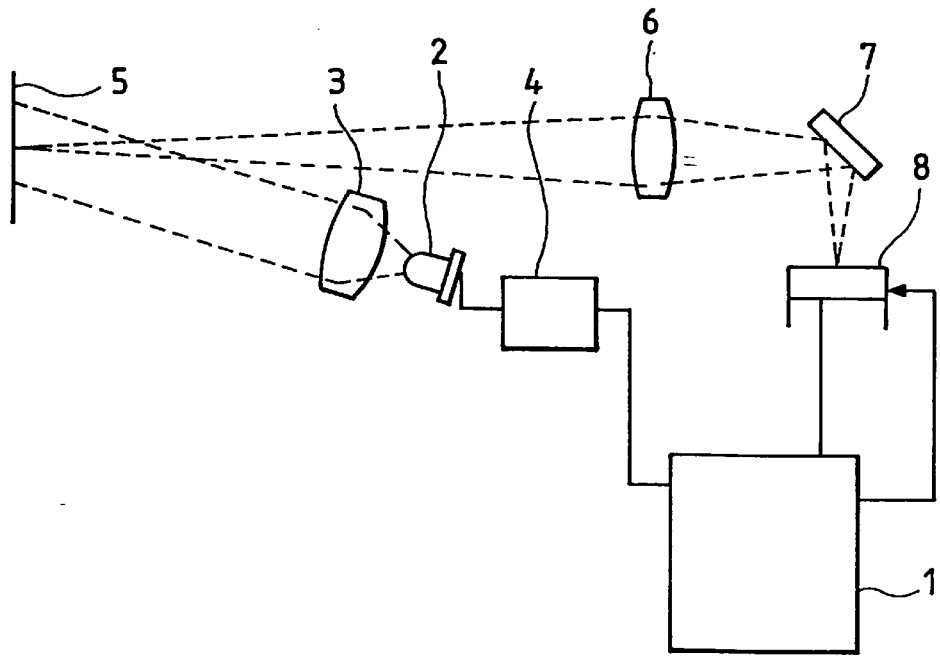
FIG. 7 shows schematically the structure of a apparatus for optical reading of information.
Figure 8:
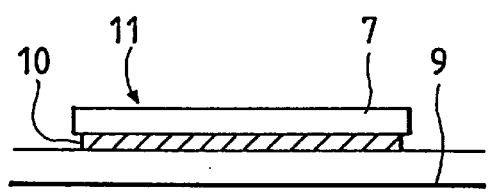
FIG. 8 shows a conventional mirror fitting structure.
Figure 9:
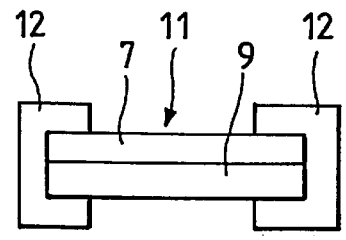
FIG. 9 shows another conventional mirror fitting structure.
Figure 10:
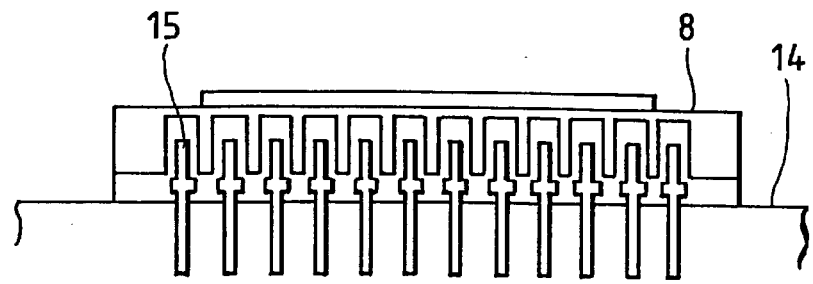
FIG. 10 shows a conventional CCD fitting structure.

The housing 21 comprises a front portion 30 and a body portion 31 that are integrally molded from synthetic resins or the like. The front portion 30 has the mirror 26 disposed for bending reflected light that is launched at an angle (substantially at a right angle in the illustrated embodiment) with respect to the line connecting the light receiving lens 23 and the mirror 24. The body portion 31 has the light receiving lens 23, mirror 24 and CCD 25 in position. As shown in FIGS. 5 and 6, the front portion 30 is cut off for reception of reflected light that is launched along an extension of the line connecting light receiving lens 23 and mirror 24 (as indicated by the one-long-and-one-short dashed line B in FIG. 5). Therefore, in order to guide the cutting off of that portion, a V-shaped groove 32 and elongated cutouts 33 are formed in appropriate positions in the width of the boundary between the body portion 31 and the front portion 30.

The front portion 30 of the housing 21 has an inclined surface 34 formed at the foremost end of the side which is remote from the side of the substrate 27 where the signal processing circuit (not shown) is mounted (said remote side is hereunder referred to as the "obverse side"). The mirror 26 is fixed to the length of the inclined surface 34.

The body portion 31 of the housing 21 has a recess 36 formed in the surface of the obverse side in such a way that it is open at both ends and that transmits reflected light. Optical devices such as light receiving lens 23 and a diaphragm stop (or an aperture stop) 37 are fitted in the front portion of the recess 36 and fixedly positioned in cooperation with the lid 22. Mirror 24 is positioned at a specified angle at the rear open end.

The recess 36 is surrounded by a thick-walled portion 38 which has its rear end face 39 inclined to provide a slope at the same angle as is required by the mirror 24. Both ends of the reflecting face of the mirror 24 are brought into contact with the inclined surface 39 such as to determine the required angle of reflection. To fix the mirror 24 at the required angle, the side of the lid 22 facing the inclined surface 39 is inclined to have a slope 40 at substantially the same angle and a layer of sponge 41 (which may be a leaf spring or an adhesive) is inserted between the inclined surface 40 and the mirror 24, to press both end faces of the mirror 24 into direct contact with the inclined surface 39.

An elongated hole 42 for passing the reflected light from the mirror 24 is formed across the width of the rear end portion of the recess 36. A groove 43 open to the substrate 27 is formed to position CCD 25 in such a way that its light receiving surface is faced up to the elongated hole 42. The groove 43 has shoulders 44 formed inward of the longer sides. Both side walls defining the groove 43 have both recesses into which a leaf spring 46 is to be fitted and, subsequent thereto, shoulders 45 that will engage the end portions the spring. Such recesses are formed outward of those side walls and close to the respective end portions in the direction of the width of the housing 21.

CCD 25 is fitted into the groove 43 and fixed in position with an elastic member 47 such as sponge being pressed into contact with the shoulders 44 and placed at the peripheral edge of CCD 25 whereas the underside of CCD 25 is brought into intimate contact with the leaf spring 46. Terminal pins 51 on CCD 25 are adapted to be inserted into buried sockets 52 in the substrate 27 and the possible fluctuations in the amount of insertion that will occur when pins 51 are connected electrically to the substrate 27 are absorbed in the manner described below.

In the embodiment under discussion, the elastic member 47 is pressed into contact with the shoulders 44 and the leaf spring 46 is brought into intimate contact with the underside of the CCD 25 to fix it in position. Thus, the leaf spring 46 is used as positioning means and this is because the fabrication process of CCD 25 is such that greater accuracy in positioning can be attained by referencing the light receiving plane of CCD 25 against its underside. If the desired correctness is attained by using the light receiving plane as the reference, the elastic member 47 is placed on the underside of CCD 25, which is brought into contact with the shoulders 44 to achieve the correct positioning of the CCD.

With the optics and the CCD 25 for receiving the incoming light image thus accommodated, the housing 21 is then fitted to the substrate 27 having a signal processing circuit (not shown) mounted thereon. As FIG. 1 shows, a first boss 48 and a second boss 49 are formed at specified heights on the body portion 31 in appropriate positions and a third boss 35 is formed at a specified height on the front portion 30 in an appropriate position. To fit the optics and CCD 25 onto the substrate 27, the distal ends of the three bosses are first brought into contact with the substrate and the first boss is detachably engaged with the substrate 27 by means of a screw 50 threaded into the tip of the first boss whereas the second and third bosses are connected to the substrate 27 by fitting the tapered distal ends into corresponding holes in the substrate 27.

As a result of this fitting operation, the housing 21 is fixedly positioned maintaining a specified distance from the substrate 27 that is determined by the lengths of the respective bosses. Even the underside of the CCD 25 which is the nearest to the substrate 27 of all the components accommodated in the housing 21 assures a specified spacing from the substrate 27. This is to ensure that ICs and other circuit components can be mounted on the major surface of the substrate 27 including the area facing the underside of CCD 25, whereby the utilization of the substrate 27 is sufficiently enhanced to realize a compact apparatus. A further advantage of providing the specified spacing is its ability to absorb the possible fluctuations in the amount by which the terminal pins 51 on CCD 25 are inserted into the sockets in the substrate 27.

In addition, the housing 21 once fitted to the substrate 27 can be easily separated from the latter by merely removing the screw 50 and pulling the pins 51 out of the sockets 52. This offers an incidental advantage in that even if circuit components are mounted on the side of the substrate 27 which faces the underside of the CCD 25, they can be easily serviced to allow for very efficient procedures of maintenance and inspection.

Figure 4A:
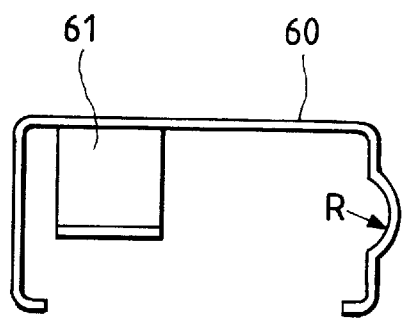
FIGS. 4(a) and 4(b) show the structure of a leaf spring for use in the apparatus of FIG. 1.
Figure 4B:
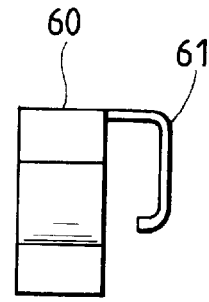

FIG. 4 shows another example of the leaf spring that can be used to fix the CCD 25, with FIG. 4*a* being a front view and FIG. 4*b* a side view. As shown, the leaf spring 60 has a side flap 61, which is brought into contact with an end face of the CCD 25 such that the latter can be fixed in both directions of its height and width with respect to the housing 21.

FIGS. 5 and 6 show an embodiment of the already mentioned case of receiving reflected light travelling in the path of an extension of the line connecting the light receiving lens 23 and the mirror 24 (as indicated by the one-long-and-one-short dashed line B in FIG. 5). The housing shown in FIG. 5 is solely composed of the body portion 31 that remains after cutting off the front portion 30 of the housing 21 shown in FIG. 1; the structure of the body portion 31 is essentially the same as shown in FIG. 1 and hence need not be described here. The only difference is that CCD 25 is fixed in height by means of the leaf spring 60 shown in FIG. 4 and that the position of CCD 25 relative to the housing 21 is fixed in the direction of its width by means of the side flap 61 of the leaf spring 60.

In the embodiment shown in FIGS. 1 to 3, the housing is fabricated as a single entity, which is so adapted that its front portion can be cut off to enable its application to the embodiment shown in FIGS. 5 and 6. Of course, this is not the sole case of the invention and two types of housing, one consisting of the body and front portions and the other consisting of only the body portion may independently be fabricated.

Thus, according to the present invention, a light receiving lens, mirrors and a photoelectric transducer are fixed in a single, integrally molded housing, which is detachably fixed on a substrate that has a processing circuit mounted thereon and which is spaced from the photoelectric transducer. Since the optics and the light receiving surface of the photoelectric transducer for receiving the light image from the optics are both fixed to the single, integrally molded housing, the substrate can be electrically connected to the photoelectric transducer without affecting the precision in the relative positions of the individual optical parts and this improves not only the efficiency of assembling operations but also the reliability of the fabricated reading apparatus.

In addition, the spacing between the photoelectric transducer and the substrate can effectively absorb the fluctuations in the amount by which the terminal pins on the photoelectric transducer are inserted into the substrate. Since ICs and other components can also be mounted on the side of the substrate in the area that is spaced from the transducer, the utilization of the substrate is sufficiently increased to realize a compact reading apparatus. What is more, the detachability of the housing from the substrate ensures that the parts in the housing can easily be inspected or disassembled for repair as separate entities from the substrate, thereby improving the efficiency of these operations.

As a further advantage, the mirrors and the photoelectric transducer have their angles and positions determined upon the molding of the housing and once their settings are complete, they will no longer vary significantly. What is more, the relevant factors can be present efficiently.

We claim:

1. An apparatus for optical reading of information comprising:
   an optical equipment;
   a photoelectric transducer for transforming a photo signal from said optical equipment into an electrical signal;
   a signal processing circuit electrically connecting said photoelectric transducer;
   an apparatus body;
   a substrate on which said signal processing circuit is mounted, said substrate being mounted in said apparatus body; and
   an optical equipment housing fixedly accommodating said optical equipment and said photoelectric transducer, wherein said optical equipment includes a light receiving lens and an aperture stop.

2. The apparatus for optical reading of information according to claim 1, wherein said optical equipment includes a light receiving lens, a apature stop and a mirror, and said optical equipment housing fixedly accommodates said light receiving lens, said apature stop and said mirror.

3. The apparatus for optical reading of information according to claim 2, wherein said mirror includes a first mirror and a second mirror, said optical equipment housing includes a front portion on which said first mirror is mounted, a housing body on which said light receiving lens and said second mirror are attached, said front portion being separatable from said housing body.

4. The apparatus for optical reading of information according to claim 3, wherein said front portion of said optical equipment housing includes an inclined surface on which said first mirror is mounted.

5. The apparatus for optical reading of information according to claim 3, wherein said housing body includes an inclined surface with which said second mirror comes in contact.

6. The apparatus for optical reading of information according to claim 3, wherein said apparatus further comprises a lid having an inclined surface on which said second mirror mounted with a sponge.

7. The apparatus for optical reading of information according to claim 3, wherein said first and second mirrors are arranged such that an optical axis from said first mirror to said second mirror are parallel with said substrate.

8. The apparatus for optical reading of information according to claim 1, wherein said optical equipment includes a light receiving lens and a mirror provided between said light receiving lens and said photoelectric transducer, said mirror having a reflecting surface, and wherein said mirror is attached with said optical equipment housing such that the angle of reflection of said mirror determined by pressing in part the reflecting surface of said mirror contact with said optical equipment housing.

9. The apparatus for optical reading of information according to claim 8, wherein said optical equipment housing includes an inclined surface with which said mirror comes in contact.

10. The apparatus for optical reading of information according to claim 8, wherein said apparatus further comprises a lid having an inclined surface on which said mirror mounted with a sponge.

11. The apparatus for optical reading of information according to claim 8, wherein an optical axis to said mirror is parallel with said substrate.

12. The apparatus for reading optical information according to claim 1, wherein said photoelectric transducer is positioned by contact with said optical equipment housing.

13. The apparatus for reading optical information according to claim 1, wherein said photoelectric transducer has a charge-coupled device comprising a linear array of photoelectric transducer elements.

14. An optical equipment housing for an optical reading apparatus of information in which a photo signal from an optical equipment is transformed into an electrical signal by a photoelectric transducer and the electrical signal thus transformed is processed in a processing circuit mounted on a substrate mounted on an apparatus body, wherein said optical equipment housing fixedly accommodates said optical equipment and said photoelectric transducer.

15. The housing according to claim 14, wherein said optical equipment includes a first mirror, wherein said optical equipment housing includes a front portion on which said first mirror is mounted, a body portion on which said light receiving lens and said second mirror are attached, said front portion being separatable from said body portion.

16. The housing according to 15, wherein said body portion includes a second inclined surface with which said second mirror comes in contact.

17. The housing according to claim 16, wherein said front portion includes a first inclined surface on which said first mirror is mounted.

18. The housing according to claim 17, wherein said first and second inclined surfaces are arranged such that an optical axis from said first mirror to said second mirror are parallel with said substrate.

19. An optical equipment housing for an optical reading apparatus of information in which a photo signal from an optical equipment is transformed into an electrical signal by a photoelectric transducer and the electrical signal thus transformed is processed in a processing circuit mounted on a substrate mounted on an apparatus body, wherein said optical equipment housing fixedly accommodates said optical equipment, wherein said optical equipment includes a mirror provided between said light receiving lens and said photoelectric transducer, said mirror having a reflecting surface, and wherein said optical equipment housing includes a mirror attaching portion on which said mirror is mounted such that an angle of reflection of said mirror is determined by pressing in part the reflecting surface of the mirror contact with said optical equipment housing.

20. The housing according to claim 19, wherein said mirror attaching portion comprises an inclined surface.

21. The housing according to claim 20, wherein an optical axis to said mirror is parallel with said substrate.

22. An optical equipment housing for an optical reading apparatus of information in which a photo signal from an optical equipment is transformed into an electrical signal by a photoelectric transducer and the electrical signal thus transformed is processed in a processing circuit mounted on a substrate mounted on an apparatus body, wherein said optical equipment housing fixedly accommodates said optical equipment, wherein said photoelectric transducer is positioned by contact with said optical equipment housing.

23. An apparatus for optical reading of information comprising:

an optical equipment;

a photoelectric transducer for transforming a photo signal from said optical equipment into an electrical signal;

a signal processing circuit electrically connecting said photoelectric transducer;

a substrate on which said signal processing circuit is mounted; and an optical equipment housing for accommodating said optical equipment and said photoelectric transducer, said optical equipment housing being detachably fixed on said substrate with a spacing being provided between said photoelectric transducer and said substrate.

24. The apparatus for optical reading of information according to claim 23, wherein said apparatus further comprises a leaf spring being contact with a bottom surface of said photoelectric transducer to position said photoelectric transducer.

25. The apparatus for reading optical information according to claim 24, wherein said leaf spring has U-shape and a side flap brought into contact with said photoelectric transducer.

26. The apparatus for reading optical information according to claim 23, wherein said apparatus further comprising an elastic member placed between said photoelectric transducer and said optical equipment housing.

27. An apparatus for optical reading of information comprising:

an optical equipment;

a photoelectric transducer for transforming a photo signal from said optical equipment into an electrical signal, said photoelectric transducer including terminal pins projecting therefrom;

a signal processing circuit electrically connecting said photoelectric transducer;

a substrate on which said signal processing circuit is mounted, said substrate including sockets buried therein, for receiving said respective terminal pins; and an optical equipment housing for accommodating said optical equipment and said photoelectric transducer, said optical equipment housing being detachably fixed on said substrate with a spacing being provided between said photoelectric transducer and said substrate.

28. An apparatus for optical reading of information comprising:

an optical equipment including a first mirror, a light receiving lens and a second mirror;

a photoelectric transducer for transforming a photo signal from said optical equipment into an electrical signal;

a signal processing circuit electrically connecting said photoelectric transducer;

a substrate on which said signal processing circuit is mounted; and an optical equipment housing for accommodating said optical equipment and said photoelectric transducer, said optical equipment housing being detachably fixed on said substrate with a spacing being provided between said photoelectric transducer and said substrate, wherein said optical equipment housing includes a front portion which said first mirror is mounted, a body portion on which said light receiving lens and said second mirror are attached, said front portion of said housing being separable from said body portion.

* * * * *